US012627102B2

(12) United States Patent
Lin et al.

(10) Patent No.: US 12,627,102 B2
(45) Date of Patent: May 12, 2026

(54) ELECTRICAL CONNECTOR WITH POSITIVELY RETAINED TERMINAL MODULES

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Shih-Kai Lin, New Taipei (TW); Chin-Jung Wu, New Taipei (TW); Ming-Chuan Wu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 349 days.

(21) Appl. No.: 18/231,970

(22) Filed: Aug. 9, 2023

(65) Prior Publication Data

US 2024/0055806 A1 Feb. 15, 2024

(30) Foreign Application Priority Data

Aug. 12, 2022 (CN) ......................... 202222120827.9

(51) Int. Cl.

| | |
|---|---|
| ***H01R 13/6471*** | (2011.01) |
| ***H01R 12/71*** | (2011.01) |
| ***H01R 13/405*** | (2006.01) |
| ***H01R 13/518*** | (2006.01) |
| ***H01R 13/6587*** | (2011.01) |

(52) U.S. Cl.

CPC ....... *H01R 13/6471* (2013.01); *H01R 12/716* (2013.01); *H01R 13/405* (2013.01); *H01R 13/518* (2013.01); *H01R 13/6587* (2013.01)

(58) Field of Classification Search

CPC .. H01R 12/716; H01R 13/405; H01R 13/516; H01R 13/518; H01R 13/6471; H01R 13/6587

See application file for complete search history.

(56) References Cited

U.S. PATENT DOCUMENTS

| | | | |
|---|---|---|---|
| 8,491,313 | B2 | 7/2013 | Mcnamara |
| 9,543,703 | B2 | 1/2017 | Horchler et al. |
| 10,396,481 | B2 | 8/2019 | Lauermann |
| 2003/0027439 | A1 | 2/2003 | Johnescu |

(Continued)

FOREIGN PATENT DOCUMENTS

| | | | |
|---|---|---|---|
| CN | 205863449 | U | 1/2017 |
| CN | 113488793 | A | 10/2021 |

*Primary Examiner* — Oscar C Jimenez

(74) *Attorney, Agent, or Firm* — Ming Chieh Chang

(57) ABSTRACT

An electrical connector includes: plural terminal modules each including a row of terminals arranged in a first direction and an insulator molded with the row of terminals, the plural terminal modules being arranged in a second direction perpendicular to the first direction; and an insulating housing overmolding and retaining the plurality of terminal modules to define a mating cavity, wherein the insulator of each terminal module defines plural through holes running therethrough in the second direction, and materials of the insulating housing fill the through holes of each terminal module.

13 Claims, 8 Drawing Sheets

(56) References Cited

U.S. PATENT DOCUMENTS

| | | | | |
|---|---|---|---|---|
| 2013/0189858 | A1* | 7/2013 | Johnescu | H01R 13/6585 439/95 |
| 2013/0273781 | A1* | 10/2013 | Buck | H01R 13/6585 439/626 |
| 2019/0067876 | A1 | 2/2019 | Tang et al. | |
| 2019/0089097 | A1 | 3/2019 | Cho et al. | |
| 2021/0075143 | A1 | 3/2021 | Laurx et al. | |
| 2022/0368078 | A1* | 11/2022 | Murakami | H01R 13/6471 |

* cited by examiner

ELECTRICAL CONNECTOR WITH POSITIVELY RETAINED TERMINAL MODULES

BACKGROUND OF THE INVENTION

1. Field of the Invention

The present invention relates to an electrical connector with a plurality of terminal modules retained in an insulating housing.

2. Description of Related Arts

U.S. Patent Application Publication No. 2019/0089097A1 discloses an electrical connector including an insulating housing and plural rows of terminals retained in the housing. Each row of terminals includes plural grounding terminals and plural differential pairs of signal terminals in a first direction. The grounding terminal includes a base portion and two separated elastic arms extending from the base portion. The signal terminal includes a base portion and one elastic arm extending from the base portion. The terminals are inserted into and retained in the insulating housing by interference fit. For a large quantity of the terminals, the assembling process of the terminals into the housing may take a lot of time, and moreover the terminals may become loose from the insulating housing.

An improved electrical connector is desired.

SUMMARY OF THE INVENTION

The instant invention is to provide an electrical connector for positively retained terminal modules in an insulating housing.

To achieve the above-mentioned object, an electrical connector comprises: a plurality of terminal modules each comprising a row of terminals arranged in a first direction and an insulator molded with the row of terminals, the plurality of terminal modules being arranged in a second direction perpendicular to the first direction; and an insulating housing overmolding and retaining the plurality of terminal modules to define a mating cavity, wherein the insulator of each terminal module defines a plurality of through holes miming therethrough in the second direction, and materials of the insulating housing fill the through holes of each terminal module.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
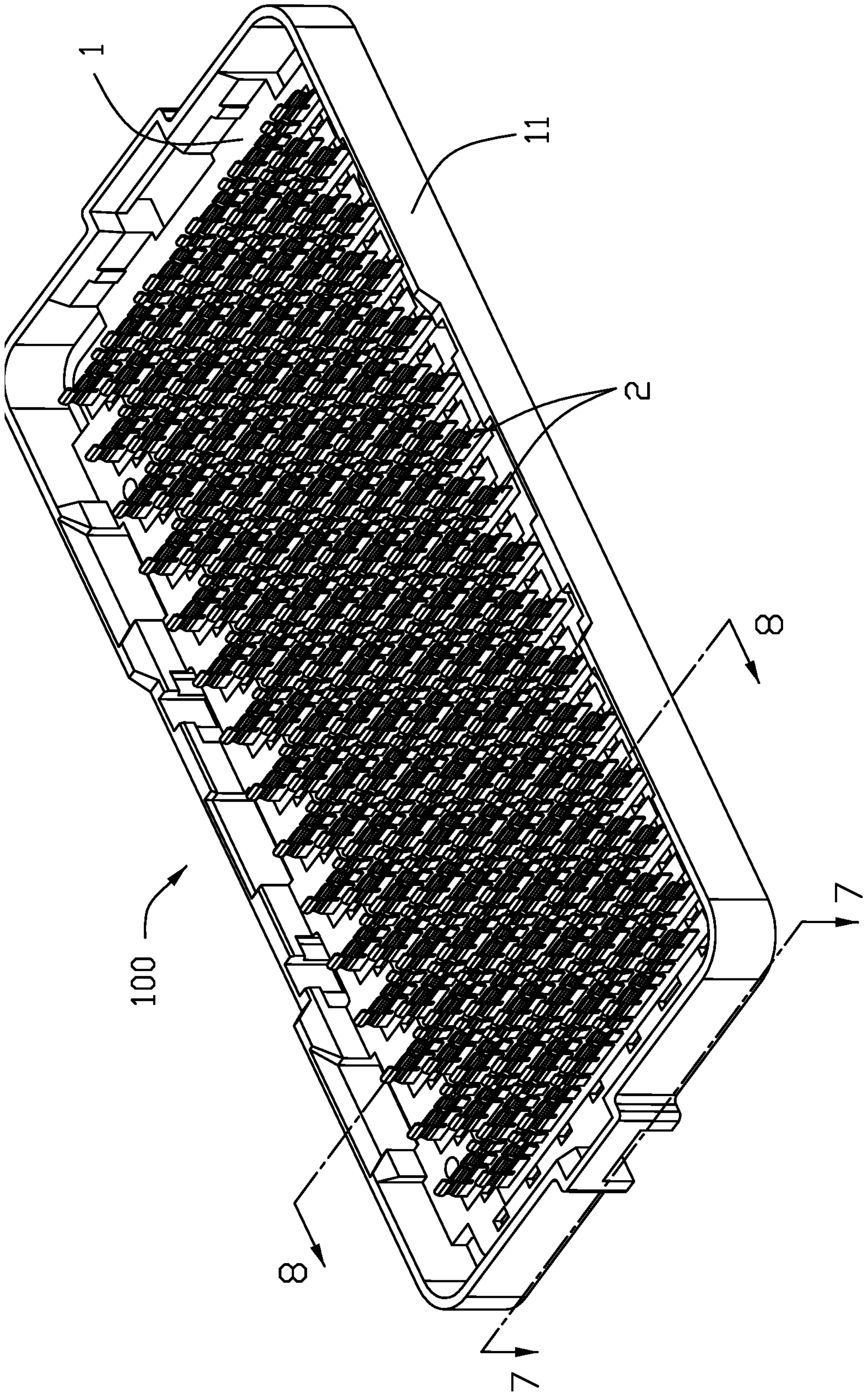
FIG. 1 is a top perspective view of an electrical connector in accordance with the present invention.
Figure 2:
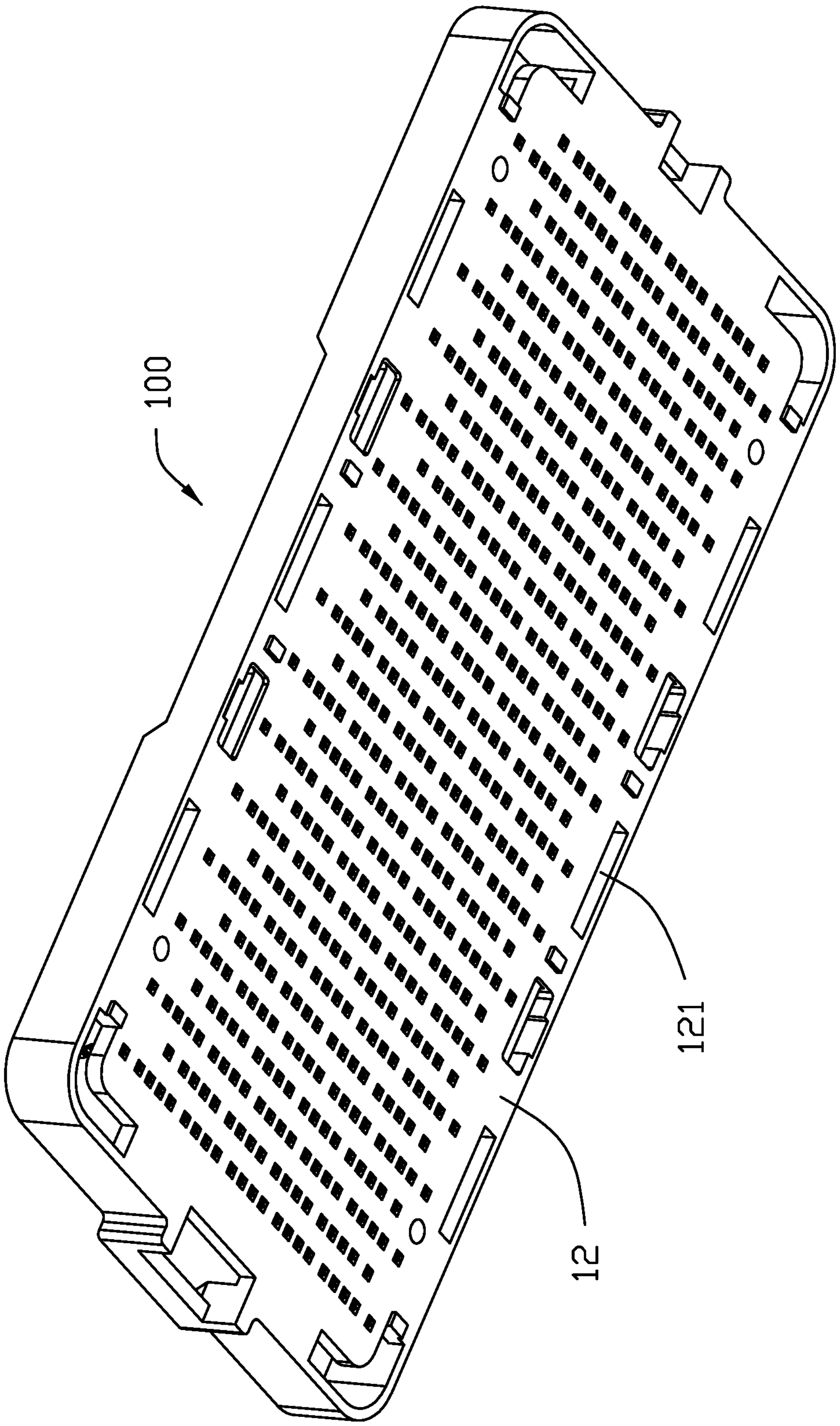
FIG. 2 is a bottom perspective view of the electrical connector in FIG. 1.

Reference will now be made in detail to the preferred embodiments of the present invention.

Referring to FIGS. 1-4, an electrical connector 100 in this embodiment of this invention is illustrated, which is of a type of a mezzanine connector and includes a plurality of terminal modules 2 and an insulating housing 1. The insulting housing 1 includes a bottom portion 12 and side walls 11 extending upwards from the bottom portion 12, and commonly defines a mating cavity 13 among the bottom portion 12 and the side walls 11, the plurality of terminal modules 2 are retained in bottom portion 12, the terminals exposes to the mating cavity 13.

Figure 5:
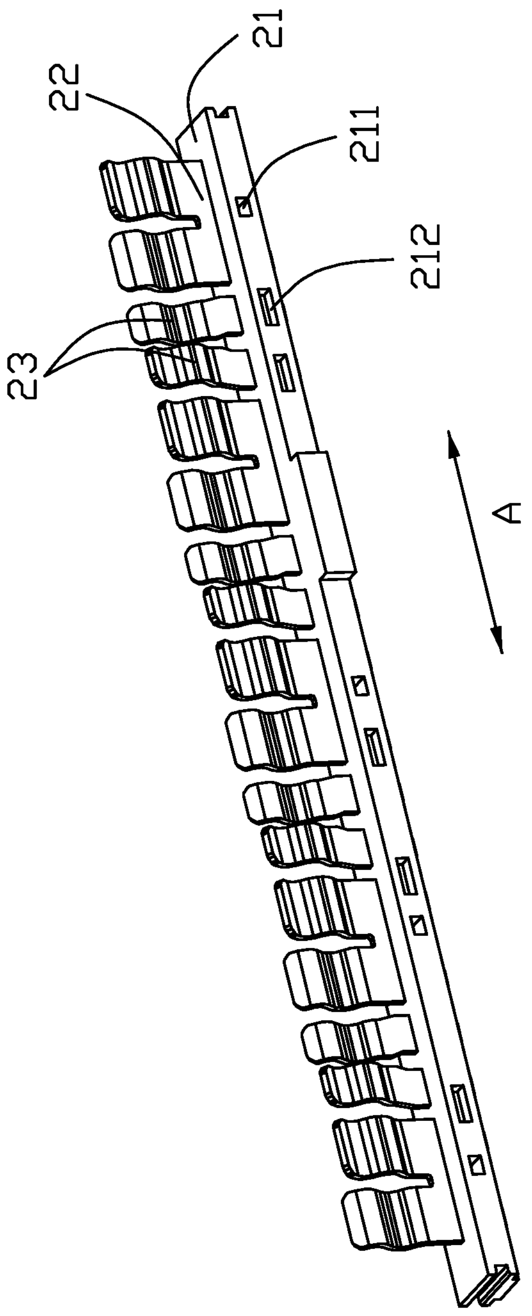
FIG. 5 is an exploded perspective view of a terminal module in FIG. 3.
Figure 6:
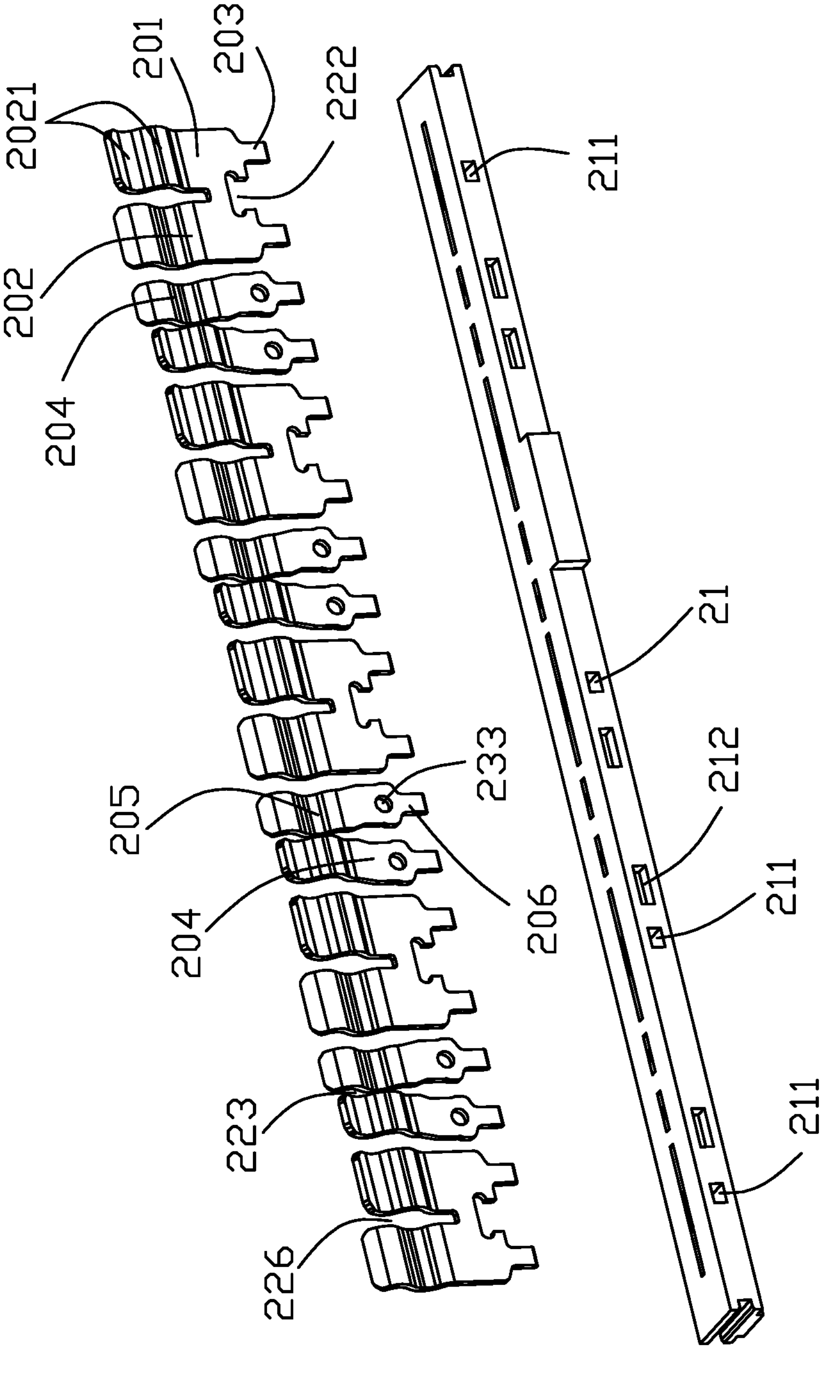
FIG. 6 is an exploded perspective view of the terminal module in FIG. 5.
Figure 7:
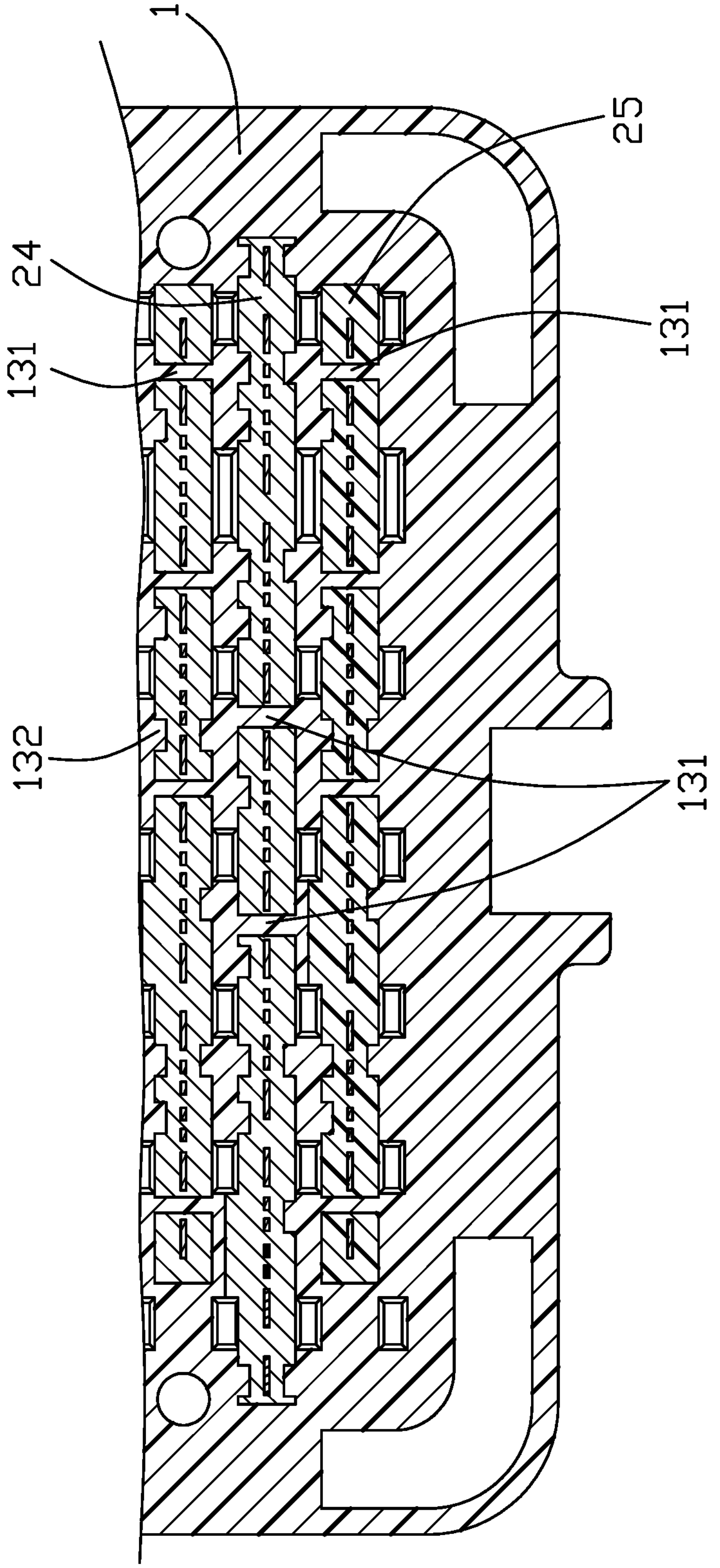
FIG. 7 is a cross-sectional view of the electrical connector taken along a broken line 7-7 in FIG. 1.

Referring to FIGS. 5-8, each of the terminal module 2 includes an insulator 21 and a plurality of terminals 20 arranged a row in a first direction A, the insulator 21 retains the row of terminals 20 by another injection molding process. The terminal 20 includes a base portion, an elastic arm extending upwards from the base portion and a leg portion extending downwards from the base portion. Each of the terminal module 2 defines plural through holes 211 through two opposite sides of the insulator 21 in a second direction B and plural recessed holes 212 at one side of the insulator 21 in the second direction, the recessed holes 212 do not run through the insulator 21 in the second direction. The plurality of terminal modules 2 are arranged in the second direction and retained in the insulating housing 1. The bottom portion 12 defines plural longitudinal grooves 121 running through the bottom portion 12 along a third direction or an upright direction. In this embodiment, the terminal modules 2 are arranged in the second direction and insulating material of the insulating housing 1 is injection molded to the plurality of terminal modules 2 and then cools to be the insulating housing 1. The through holes 211 are filled with the insulating material, improving the combination of the housing 1 and the terminal modules 2. The recessed holes 212 also improve the combination of the terminal modules 2 and the housing 1. Referring to FIG. 7, the portions 131, 132 of the insulating housing 1 are filled with the through holes 211 and the recessed holes 212. The insulators 21 are embedded in the bottom portion 12.

Figure 3:
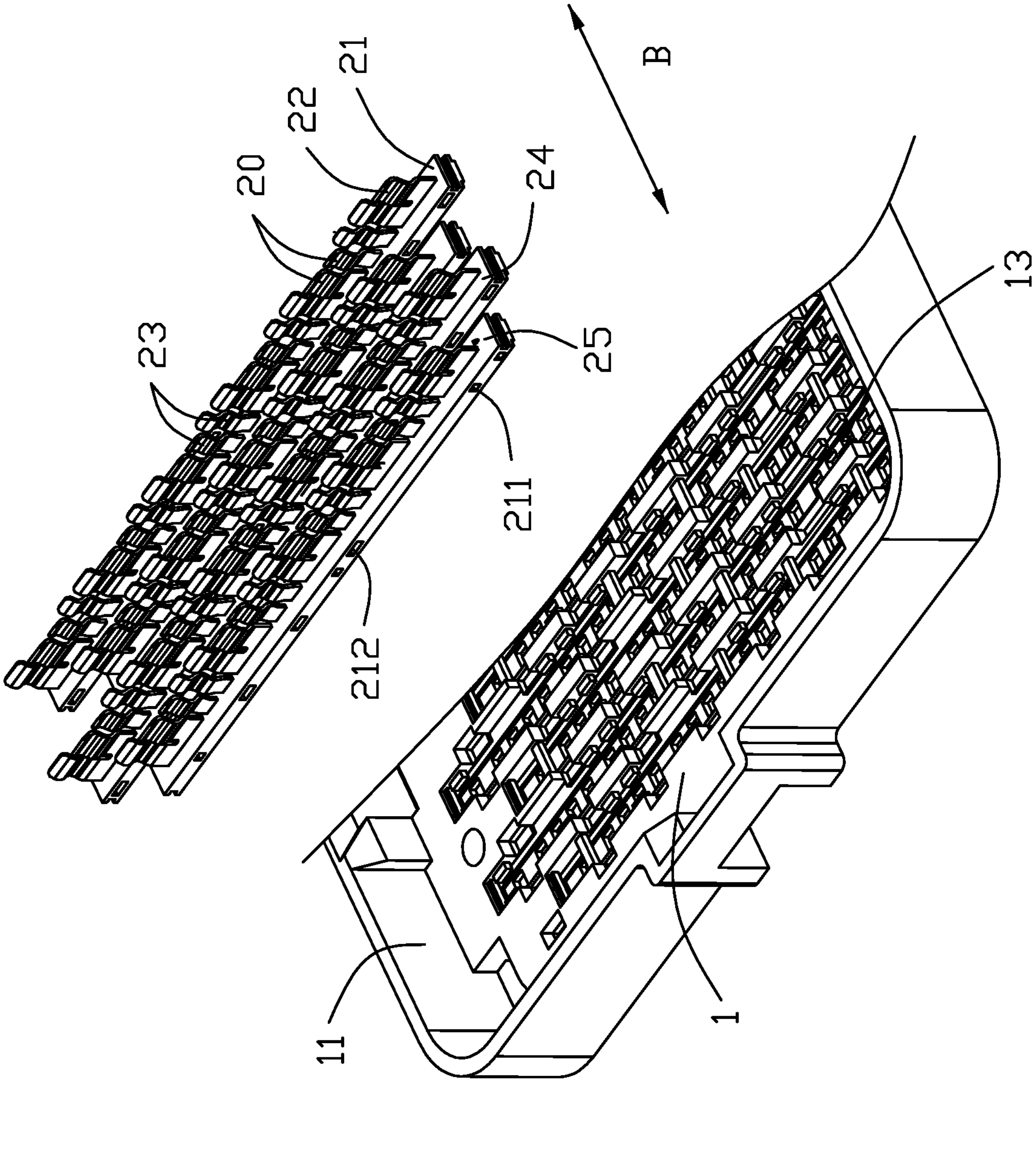
FIG. 3 is an exploded perspective view of part of the electrical connector in FIG. 1.
Figure 4:
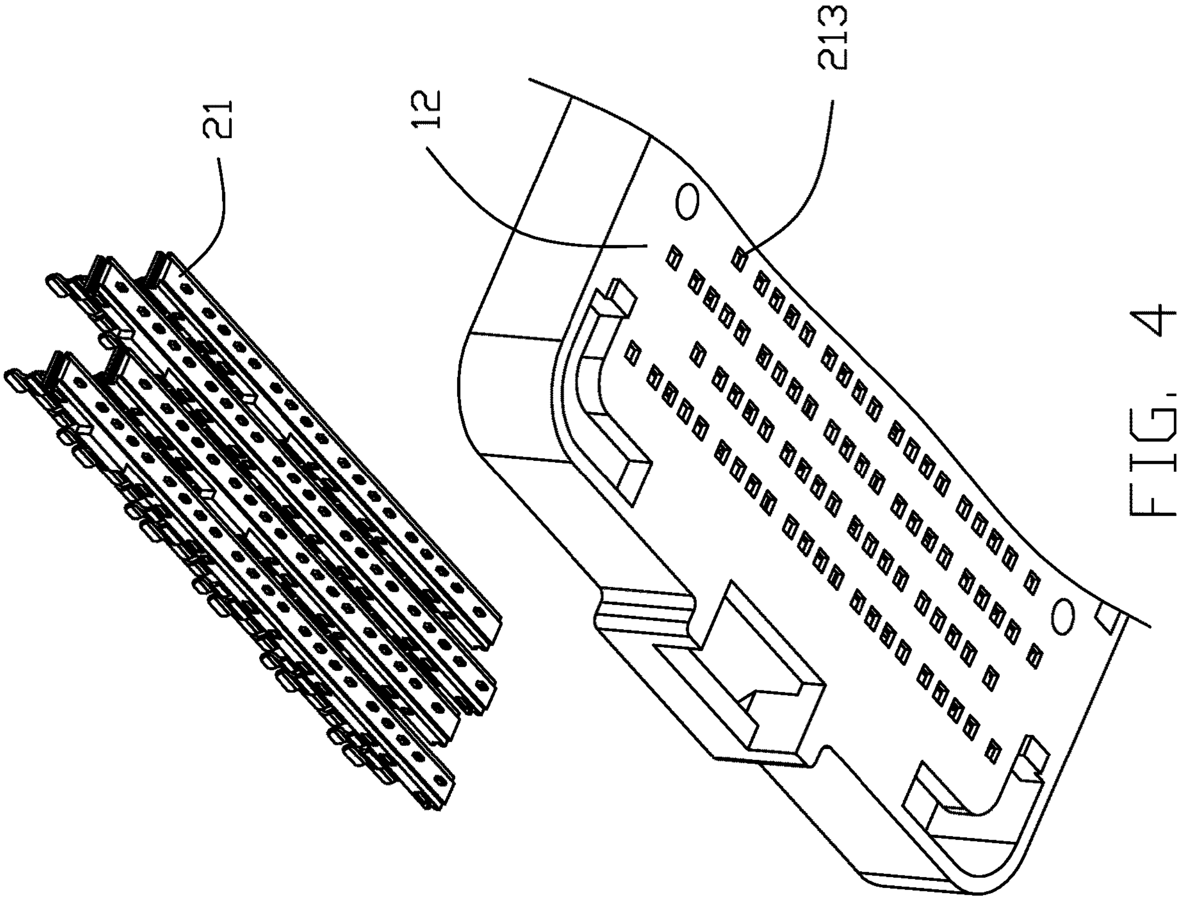
FIG. 4 is another exploded perspective view of the electrical connector in FIG. 3.

Referring to FIGS. 3-5, the plurality of terminals 20 in one row includes plural grounding terminals 22 and pairs of differential-pair signal terminals 23. The insulators 21 of adjacent terminal modules 2 differ in length in the first direction, the longer terminal modules are named as first terminal modules 24, the other terminal modules are named as second terminal modules 25. The first terminal module 24 includes six grounding terminals 22 and five pairs of signal terminals 23, the second terminal module 25 includes five grounding terminals and four pairs of signal terminals. The grounding terminals 22 and the pairs of signal terminals 23 are arranged alternately in the first direction. Referring to FIG. 7, the first terminal module 24 has two through holes 211, the second terminal module 25 has four through holes 211. The insulating material of the insulating housing 1 fills the through holes 131, for improving the combination of the terminal modules and the housing 1. FIG. 4, the bottom portion 12 defines square holes 213 opening in the upright direction, the leg portions 203 go across the square holes 213.

Referring to FIG. 6, the grounding terminals 22 are wider than the signal terminals in the first direction. The grounding terminal 22 includes a main portion 201, two elastic arms 202 extending upwards from the main portion and two leg portions 203 extending downwards from the main portion, the two elastic arms 202 are arranged side by side in the first direction with a gap 226. The width of the two elastic arms 202 adding the gap 226 equals to the width of the main portion 201. The elastic arm 202 extends upwards with continual arcs and form two arc portions 2021 protruding oppositely, wherein upper arc portions of the two elastic arms 202 are functioned as contacting portions to mate with a complementary connector. As shown, the two adjacent elastic arms 202 of the same grounding terminal protrude oppositely in the second direction. The main portion 201 of the grounding terminal defines a notch 222 at a lower edge thereof, the notch 222 is located between the two leg portions 203. Please notes, the through holes 211 go cross the notch 222.

Referring to FIG. 6, the differential pair of signal terminal includes two signal terminals 23 with a gap 223 in the first direction. Each signal terminal 23 includes a main portion 204, a leg portion 206 and an elastic arm 205. The width of the elastic arm 205 in the first direction equals the width of the main portion 204. The elastic arm 205 of the signal terminal 23 are twice oppositely in the second direction, wherein an upper arc portion is used as contacting portion. The main portions 204 of the signal terminals 23 defines through holes 233 in the second direction, an axial lines of the through holes 223 are offset from corresponding elastic arms 204. The width of the two elastic arms 203 of the differential-pair terminal is smaller than the two elastic arms 202 of the grounding terminal 22.

Referring to FIG. 5, please notes, the two elastic arms 202 of a same grounding terminal 22 direct oppositely, the elastic arm 205 of the signal terminal 23 and the adjacent elastic arm 202 of the grounding terminal 22 are direct in a same second direction while the two elastic arms 204 of the differential pair direct oppositely. Referring to FIG. 3, seen in the second direction, one elastic arm of each differential pair wholly overlap with the corresponding grounding terminal located in the adjacent row, while another elastic arm of the differential pair partially overlap with the corresponding grounding terminal located in the adjacent row.

Figure 8:
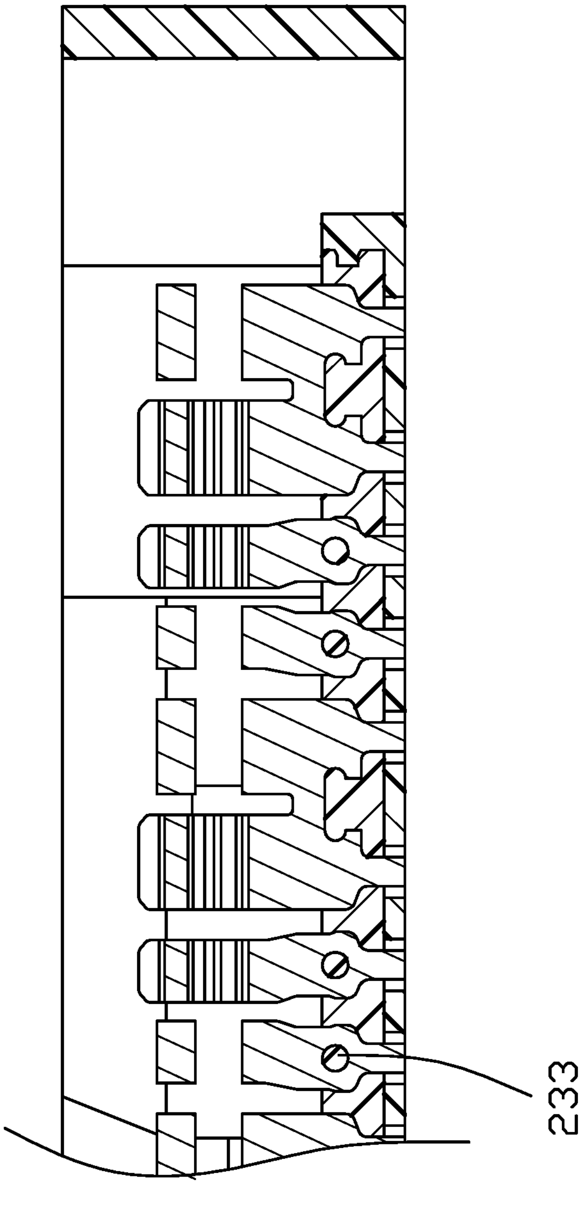
FIG. 8 is a cross-sectional view of the electrical connector taken along a broken line 8-8 in FIG. 1.

Referring to FIGS. 7-8, during the insulating housing 1 is made by the injection molding process, some molding portions of the housing 1 fill the through holes 131 and the through holes 233 of the signal terminals 23 and the notches 222 of the grounding terminals, ensuring the signal terminals and the grounding terminals to be retained in the insulator 21. Some molding portions of the housing 1 fill the recessed holes 212 of the insulator 21.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

a plurality of terminal modules each comprising a row of terminals arranged in a first direction and an insulator molded with the row of terminals, the plurality of terminal modules being arranged in a second direction perpendicular to the first direction; and an insulating housing overmolding and retaining the plurality of terminal modules to define a mating cavity;

wherein the insulator of each terminal module defines a plurality of through holes running therethrough in the second direction, and materials of the insulating housing fill the through holes of each terminal module;

wherein each row of the terminals comprises grounding terminals and differential pairs of signal terminals arranged alternately in the first direction, each grounding terminal defines a notch recessed from a lower edge thereof, and the through holes are aligned with the corresponding notches; and wherein each signal terminal defines a through hole, the through holes and the through holes of the insulator with the aligned notches are filled with the material portions of the insulating housing.

2. The electrical connector as claimed in claim 1, wherein the insulating housing comprises a bottom portion and wall portions extending from the bottom portion, the mating cavity is defined among the wall portions and the bottom portion, the insulators are embedded in the bottom portion.

3. The electrical connector as claimed in claim 2, wherein the plurality of terminal modules divides into first terminal modules and second terminal modules, the first terminal modules are longer than the second terminals modules in the first direction.

4. The electrical connector as claimed in claim 3, wherein opposite ends of the first terminal modules protrude beyond the second terminal modules in the first direction.

5. The electrical connector as claimed in claim 1, wherein each row of the terminals comprises grounding terminals and differential pairs arranged alternately in the first direction, each differential pair is composed of two signal terminals, two adjacent grounding terminals sandwiched one differential pair and the two adjacent differential pair sandwich one grounding terminal; the grounding terminal comprises a main portion, two elastic arms extending upward from the main portion and two leg portions extending downward from the main portion, the two elastic arms are separated from each other with a gap in the first direction; the signal terminal comprises a main portion, an elastic arm extending upward from the main portion and a leg portion extending downward from the main portion.

6. The electrical connector as claimed in claim 5, wherein each elastic arm arcs in the second direction to form a contacting portion, the two elastic arms of a same grounding terminal direct oppositely, the elastic arm of one signal terminal and the adjacent elastic arm of the grounding terminal direct in a same direction while the two elastic arms of the differential pair direct oppositely.

7. The electrical connector as claimed in claim 6, wherein the main portion of the grounding terminal defines a notch recessed upwards, the main portion of the signal terminal defines a through hole, the through holes are offset from a central axis in an upright direction of corresponding elastic arm of the signal terminal.

8. The electrical connector as claimed in claim 5, wherein a width from one edge to another edge of the grounding terminal is larger than a width from two opposite sides of the differential pair.

9. An electrical connector comprising:

an insulating housing;

a first row of terminals arranged in a first direction and a second row of terminals arranged in the first direction and both rows of terminals retained in the insulating housing, the first row and the second row of terminals being arranged in a second direction perpendicular to the first direction, each terminal extending in an upright direction perpendicular to the first direction and the second direction, each row of terminals including plural differential pairs of signal terminals and plural grounding terminals;

the signal terminal having a main portion, a single elastic arm extending upward from the main portion, and a leg portion extending downward from the main portion;

the grounding terminal having a main portion, two elastic arms extending upward from the main portion, and two leg portions extending downward from the main portion, the two elastic arms separating from each other with a gap in the first direction;

each elastic arm of the signal and grounding terminals curving in the second direction to form a contacting portion;

wherein the two elastic arms of a same grounding terminal are curving oppositely, the elastic arm of the signal terminal and an adjacent elastic arm of the grounding terminal are curving in a same direction while the two elastic arms of the differential pair of signal terminals are curving oppositely.

10. The electrical connector as claimed in claim 9, wherein two adjacent grounding terminals sandwich one differential pair and two adjacent differential pairs sandwich one grounding terminal.

11. An electrical connector comprising:

a plurality of terminal modules each comprising a row of terminals arranged in a first direction and an insulator molded with the row of terminals, the plurality of terminal modules being arranged in a second direction perpendicular to the first direction; and an insulating housing overmolding and retaining the plurality of terminal modules to define a mating cavity; wherein the insulator of each terminal module defines a plurality of through holes running therethrough in the second direction, and materials of the insulating housing fill the through holes of each terminal module;

each row of the terminals comprises grounding terminals and differential pairs arranged alternately in the first direction, each differential pair is composed of two signal terminals, two adjacent grounding terminals sandwiched one differential pair and the two adjacent differential pair sandwich one grounding terminal, the grounding terminal comprises a main portion, two elastic arms extending upward from the main portion and two leg portions extending downward from the main portion, the two elastic arms are separated from each other with a gap in the first direction, and the signal terminal comprises a main portion, an elastic arm extending upward from the main portion, and a leg portion extending downward from the main portion; and each elastic arm arcs in the second direction to form a contacting portion, the two elastic arms of a same grounding terminal direct oppositely, and the elastic arm of one signal terminal and the adjacent elastic arm of the grounding terminal direct in a same direction while the two elastic arms of the differential pair direct oppositely.

12. The electrical connector as claimed in claim 11, wherein the main portion of the grounding terminal defines a notch recessed upwards, the main portion of the signal terminal defines a through hole, the through holes are offset from a central axis in an upright direction of corresponding elastic arm of the signal terminal.

13. The electrical connector as claimed in claim 11, wherein a width from one edge to another edge of the grounding terminal is larger than a width from two opposite sides of the differential pair.

* * * * *